United States Patent
Ayers

[15] 3,648,463
[45] Mar. 14, 1972

[54] FLOATING BOOM FOR OIL-SOAKED MATERIAL

[72] Inventor: Ray R. Ayers, 12522 Shepherd's Ridge, Houston, Tex. 77042

[22] Filed: Sept. 8, 1970

[21] Appl. No.: 70,098

[52] U.S. Cl. .................................................. 61/1 F
[51] Int. Cl. ............................................ E02b 15/04
[58] Field of Search ............................. 61/1 F, 3, 5

[56] References Cited

UNITED STATES PATENTS

| | | | |
|---|---|---|---|
| 3,499,290 | 3/1970 | Smith | 61/1 F |
| 877,201 | 1/1908 | Kellner | 61/3 |
| 2,185,458 | 1/1940 | Giliasso | 61/5 |

*Primary Examiner*—Peter M. Caun
*Attorney*—Harold L. Denkler and Theodore E. Beiber

[57] ABSTRACT

Apparatus for containing or collecting oil-soaked material in a body of water is disclosed. The apparatus comprises an elongate buoyant boom having a foraminous skirt depending therefrom. An impervious shaped section is secured to the bottom of the foraminous skirt to react against water movement under the boom to maintain the lower skirt end depressed in the water. A spreader bar is used to maintain the top and bottom of the skirt spaced a predetermined distance apart.

3 Claims, 3 Drawing Figures

INVENTOR
RAY R. AYERS

BY Harold L. Dinkler
ATTORNEY

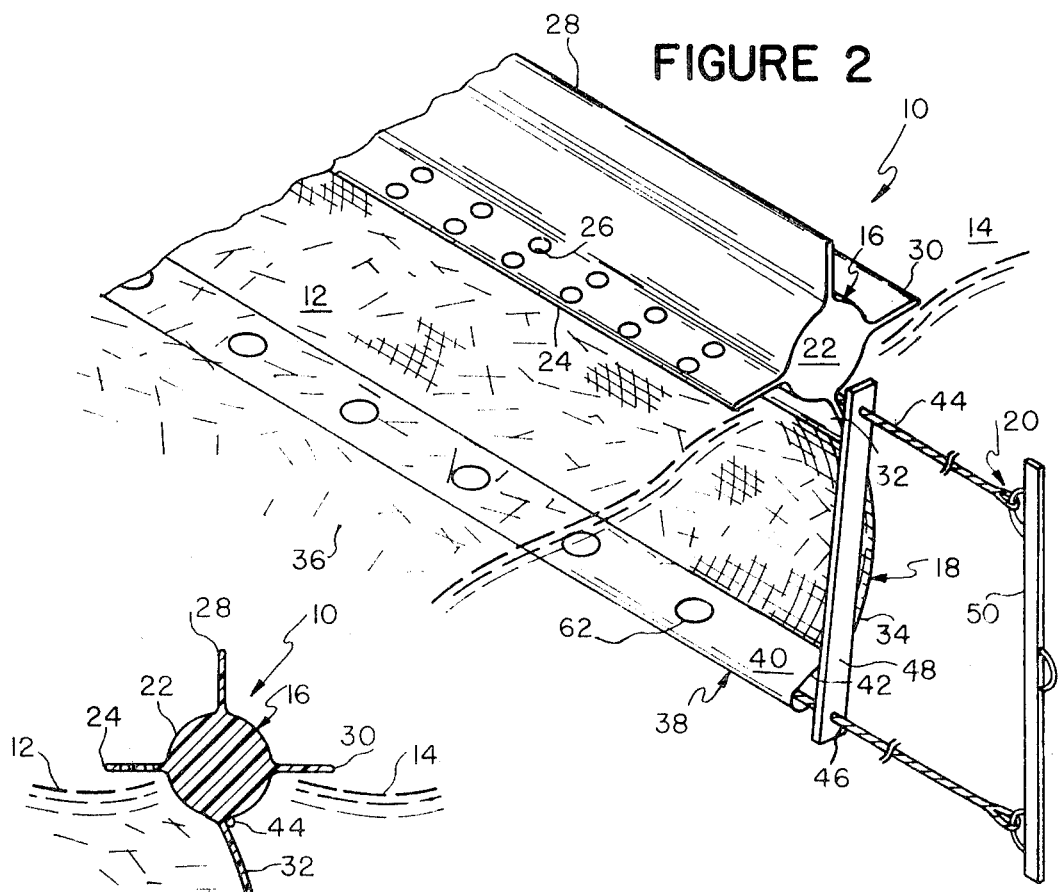

FLOATING BOOM FOR OIL-SOAKED MATERIAL

BACKGROUND OF THE INVENTION

Early techniques for controlling the spill of liquid hydrocarbons on a body of water comprised distributing oil sorbtive material, for example hay or straw, on the spill and then raking the hay into a boat or other temporary storage container. It will be apparent that this is a laborious task.

One of the most recent developments in controlling oil spills has been the provision of commercially available floating booms such as the type made by Neirad Industries and as disclosed in U.S. Pat. No. 3,499,290. This commercially available boom comprises a plurality of floats secured together and having a depending impervious weighted skirt thereon. Suitable means are provided for positioning and/or towing the boom in the water to confine and/or collect the oil-soaked particles. One disadvantage of this device is that a vortex is created on the upstream side of the boom, particularly when the boom is towed through the water to collect the oil-soaked particles. Another disadvantage of this type boom is instability at high towing rates or when subjected to high current velocities.

One proposal for collecting oil-soaked particles is disclosed in the copending application of Stark Ser. No. 48230, filed June 22, 1970 and assigned to the assignee of this invention. The disclosure of this copending application comprises an elongate buoyant boom having a foraminous skirt depending therefrom. The boom may be placed in an area of high current flow to maintain the oil-soaked particles on the upstream side of the boom or may be towed through the water to collect the oil-soaked particles. The boom of the copending application comprises a plurality of weights secured to the lower end of the foraminous skirt to maintain the lower skirt end depressed in the water.

SUMMARY OF THE INVENTION

It is an object of this invention to provide apparatus for controlling oil-soaked particles in a body of water by either positioning the apparatus in an area of high current or by towing the apparatus through the water.

Another object of the invention is to provide an apparatus for controlling oil-soaked material comprising a foraminous member which allows liquid material to pass therethrough and which collects oil-soaked particles on the upstream side thereof.

Another object of the invention is to provide a foraminous skirt depending into a water body including means carried thereby for reacting against water movement to maintain the lower skirt end depressed in the water.

A further object of the invention is to provide a boom for controlling oil spills which can be towed at higher rates or which can be subjected to greater current velocities than prior art booms.

In summary, this invention comprises an elongate buoyant boom, a foraminous skirt depending therefrom and means carried by the skirt for reacting against water movement to maintain the lower skirt end depressed in the water.

BRIEF DESCRIPTION OF THE DRAWINGS

FIG. 2 is an enlarged isometric view of one end of the device of this invention; and FIG. 3 is an enlarged cross sectional view of the device of FIGS. 1 and 2 taken substantially along line 3—3 of FIG. 1 as viewed in the direction indicated by the arrows.

DESCRIPTION OF PREFERRED EMBODIMENT

Figure 1:
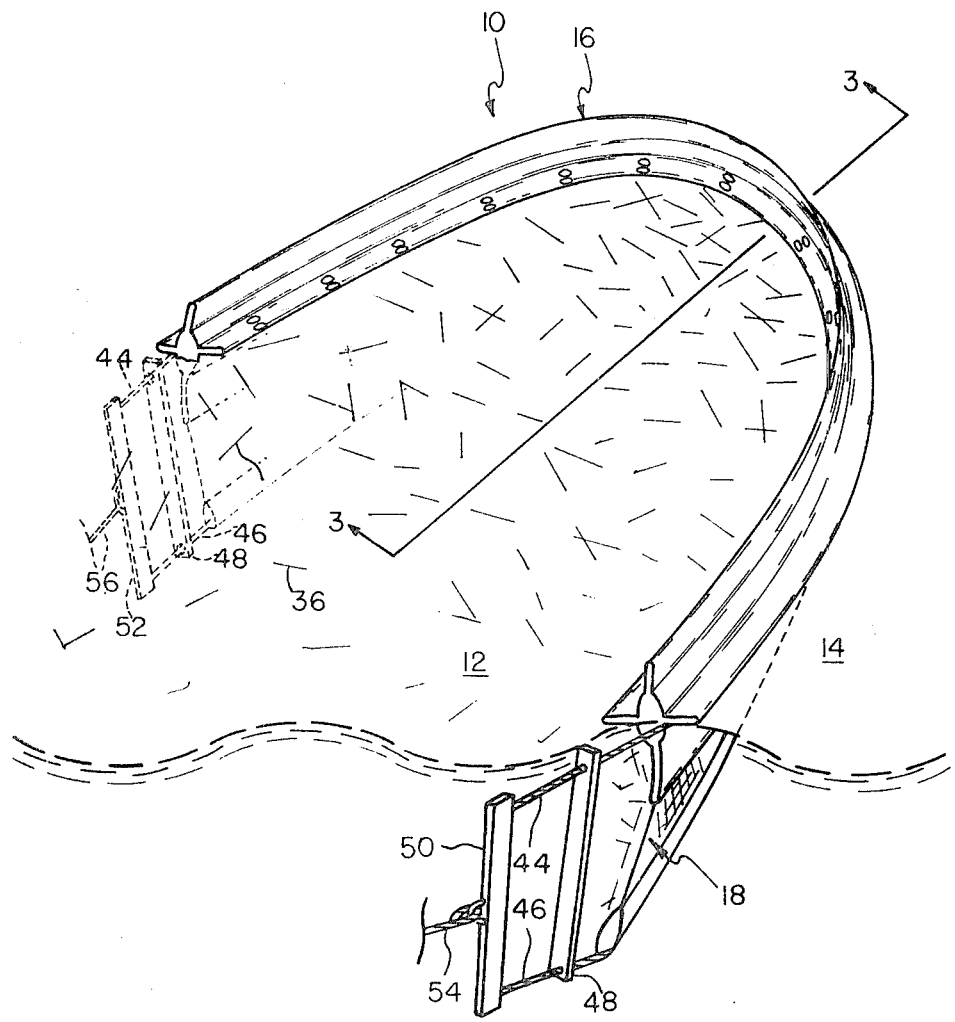
FIG. 1 is an overall isometric view of the invention.

Referring to the drawing, there is shown an apparatus 10 for controlling a spill of liquid pollutant 12 on a body of water 14. Although the liquid pollutant 12 may comprise any floating liquid, it is typically a liquid hydrocarbon. The apparatus 10 comprises as major components a buoyant boom 16, a depending skirt 18 and positioning means 20 for maintaining the boom 16 in a given location or for towing the apparatus 10 through the water 14.

The boom 16 may be of any suitable type, such as that available from Neirad Industries, Inc., and may include a single elongate buoyant float or a plurality of individual floats secured together. As illustrated, the boom 16 comprises an elongate foamed plastic float 22 having a fin 24 extending in the upstream direction and having a plurality of apertures 26 therein. The perforate fin 24 acts to dampen waves and lends substantial stability to the boom 16. Extending upwardly from the float 22 is an imperforate fin 28 which acts to minimize waves breaking over the boom 16 and thereby increasing the oil retention capability of the apparatus 10. A third fin 30 extends from the float 22 in the downstream direction and primarily provides symmetry and balance to the boom 16. The fin 30 may be provided with apertures to make the boom 16 equally effective for operation in either direction.

The skirt 18 depends from the boom 16 and comprises an upper imperforate section 32 secured to the bottom of the float 22. The section 32 may be molded contemporaneously with manufacture of the float 22 or may be secured thereto as an assembly operation. The primary function of the imperforate skirt section 32 is to prevent liquid pollutant 12 from passing under the float 16 and functions in much the same manner as the imperforate skirts of the prior art booms.

The skirt 18 also comprises a foraminous section 34 which is illustrated as comprising screen mesh but which may be a perforate sheet or the like. The foraminous section 34 allows liquid flow therethrough but collects the oil sorbtive particles 36, such as hay or straw, which have been scattered in the spill area to sorb the liquid pollutant 12. The provision of the impervious section 32 prevents liquid movement adjacent the liquid surface while the foraminous section 34 allows liquid passage. The prior art booms have generated vortices on the upstream side of the boom, particularly when towed, which causes loss of substantial quantities of oil sorbtive particles under the impervious skirt. The depth of the junction between the sections 32, 34 may be selected to minimize vortex creation and pollutant loss under the boom 16.

An important part of this invention resides in the provision of means 38 carried by the skirt 18 for reacting against water movement to maintain the lower skirt end depressed in the water. The maintaining means 38 comprises an impervious section 40 inclined downwardly and toward the upstream side of the boom 16. In the illustrated embodiment, the impervious section 40 comprises a folded sheet having a passage 42 to accommodate a cable as more fully explained hereinafter. It should be apparent, however, that the section 40 may be single ply with other means being provided to secure the cable thereto. The positioning means 20 is illustrated as comprising an upper cable or flexible line 44 connected to the boom 16 by any suitable means (not shown) such as is disclosed in U.S. Pat. No. 3,499,290. The positioning means 20 also comprises a lower cable or flexible line 46 disposed in the passage 42.

An important part of the positioning means 20 comprises a spreader bar 48 connected to the flexible lines 44, 46 adjacent the skirt 18 on opposite ends of the boom 16. The spreader bars 48 act to maintain the upper and lower skirt ends in predetermined spaced apart relation. This lends substantial stability to the apparatus 10 not found in prior art booms. For example, a prototype boom built in accordance with this invention has been successfully towed at speeds of 2 feet per second. The maximum towing speed of conventional booms is about 1.3 feet per second.

The ends of the flexible lines 44, 46 may be connected to bars 50, 52 which are in turn connected to flexible lines 54, 56 for attachment to anchors for positioning the apparatus 10 in the water 14 or for attachment to a boat for towing the apparatus 10 through the water. The spreader bars 48 are illustrated in FIG. 1 as spaced from the ends of the boom 16 merely to expose the details of the skirt 18. In use, the spreader bars 48 may be secured to the ends of the boom 16 or to the cables 44, 46 adjacent the ends of the boom 16. When not so secured and the apparatus 10 is subjected to high current velocities, the spreader bars 48 are moved by action of the water adjacent the ends of the boom 16.

Assuming that the apparatus 10 is moored in an area of high current and that the oil sorbtive particles 36 are spread on the liquid pollutant 12 upstream from the boom 16, the liquid pollutant 12 and oil sorbtive particles 36 move with the current toward the apparatus 10. The foraminous section 34 allows water movement past the boom 16 while the float 22 and the imperforate section 32 act to retain the liquid pollutant 12 upstream. The oil sorbtive particles 36 may be drawn downwardly under the imperforate section 32 by water movement therepast and are collected by the foraminous section 34 as shown in FIG. 3. Current movement under the boom 16 impacts against the impervious section 40 creating a downward force vector 58 and a horizontal downstream force vector 60 as shown in FIG. 3. The horizontal force vector 60 is resisted by the lower flexible line 46. The downward force vector 58 acts to depress the lower end of the skirt 18 and is balanced by the buoyancy of the float 22. It will accordingly be seen that the maintaining means 38 keeps the lower end of the skirt 18 depressed in the water 14 when current flows under the boom 16. Suitable weights 62 may be attached to the lower end of the skirt 18 as a supplementary measure.

When the apparatus 10 is towed behind a boat, the operation of the device is substantially the same. The impervious section 32 and boom 16 act to keep the liquid pollutant 12 upstream from the apparatus 10 while the foraminous section 34 collects any oil sorbtive particles tending to pass under the impervious section 32. Impact of water against the downwardly inclined impervious section 40 creates the same force vectors 58, 60 which are balanced by the tension in the lower flexible line 46 and the buoyancy of the float 22 respectively. It will accordingly be seen that the maintaining means 38 keeps the lower end of the skirt 18 depressed in the water 14 when the apparatus 10 is towed.

The spreader bars 48 keep the flexible lines 44, 46 a predetermined distance apart to prevent collapse of the skirt 18 thereby enhancing the stability of the device.

It should be noted that if the fin 30 is perforated, the apparatus 10 is bidirectional and operates upon water movement therepast in both directions. If it is desired to use the apparatus 10 as a conventional boom, a cable may be attached to the lower end of the imperforate skirt section 32.

It will accordingly be seen that there is provided an improved apparatus for controlling a spill of liquid pollutant in a body of water having all the advantages of this invention.

I claim as my invention:

1. Apparatus for controlling a spill of liquid pollutant on a body of water comprising:

an elongate buoyant boom comprising a foraminous fin above the boom water line extending generally horizontally toward the direction of relative water movement, an impervious fin extending upwardly from adjacent the top thereof for minimizing waves breaking over the boom, and a third fin above the boom water line on the other side of the boom from the foraminous fin, the third fin extending generally horizontally away from the direction of relative water movement;

a skirt depending from the boom comprising an impervious section connected to the boom and a foraminous section depending from the impervious section;

weight means carried by the skirt for reacting against water movement to maintain the lower skirt end depressed in the water; and means for positioning the boom and skirt comprising at least one elongate flexible line connected to the boom, at least one elongate flexible line connected to the lower end of the skirt, and means extending between the flexible lines for maintaining the upper and lower ends of the skirt in predetermined spaced apart relation.

2. The apparatus of claim 1 wherein the foraminous section of the skirt is a screen.

3. The apparatus of claim 1 wherein the means for maintaining the upper and lower ends of the skirt in spaced apart relation is at least one spreader bar.

* * * * *